Figure 9:
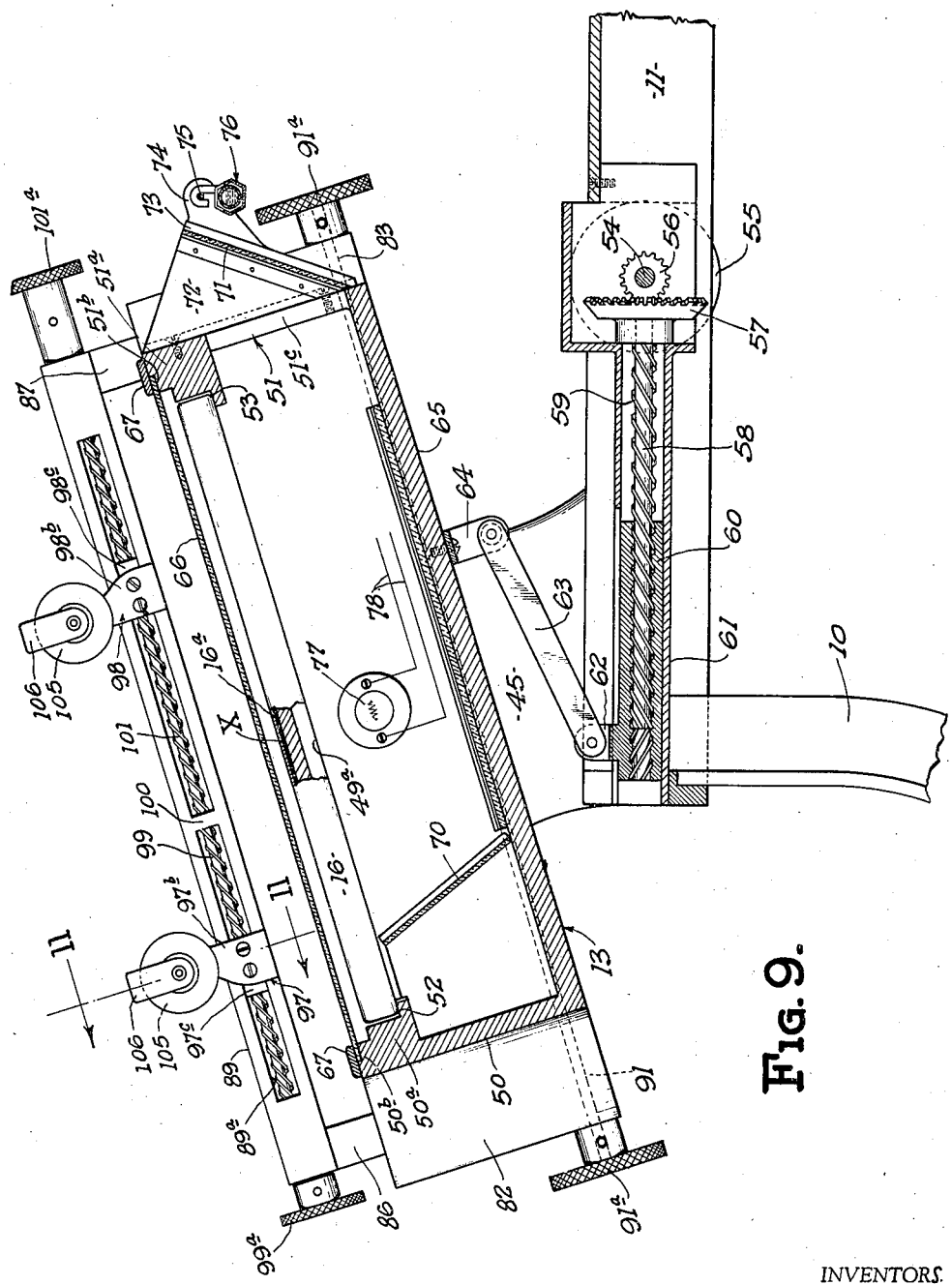

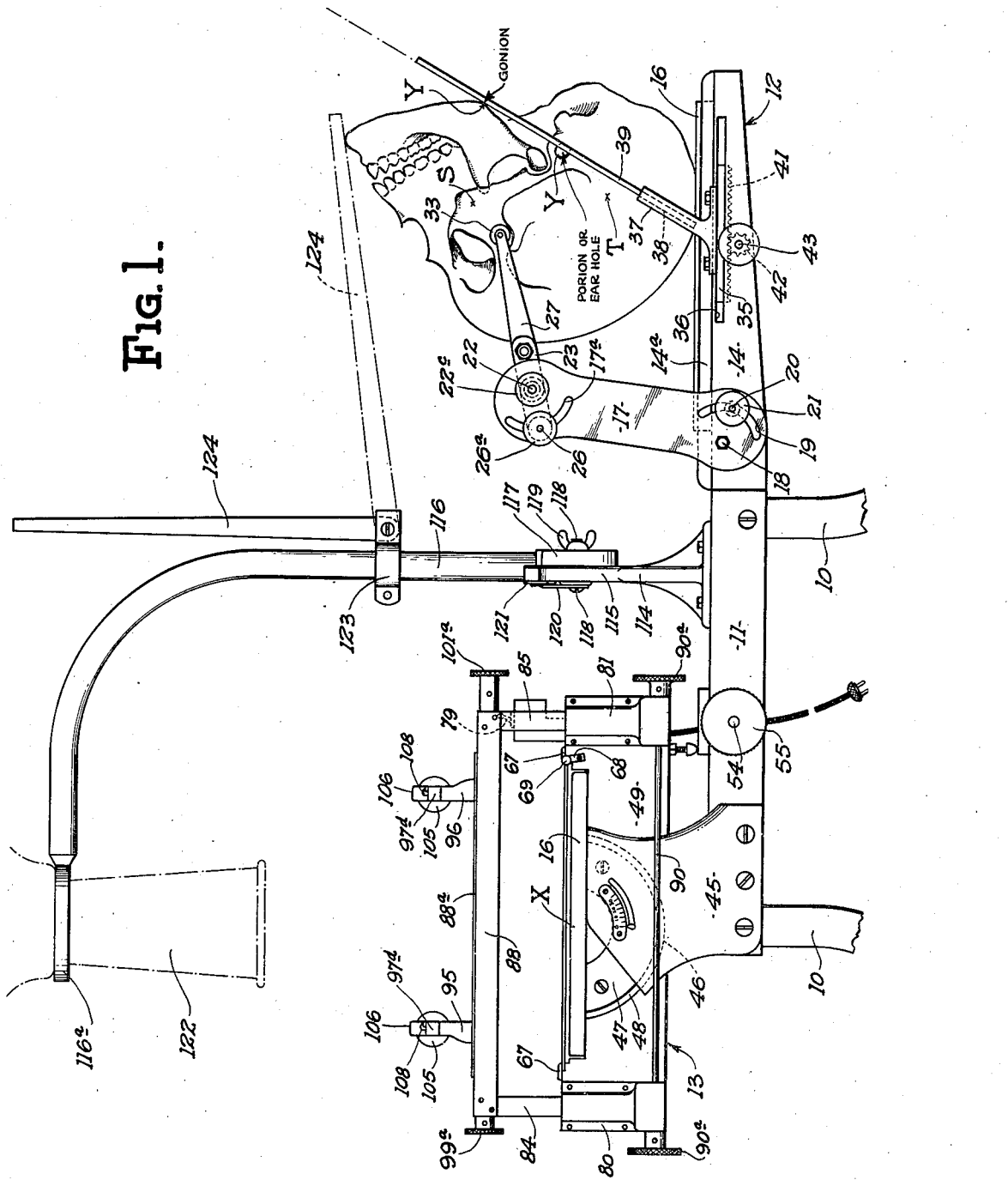

Sept. 2, 1941.     G. T. PLOTZ ET AL     2,254,544
MACHINE FOR MAKING CRANIAL ROENTGENOGRAPHS
Filed March 20, 1939     5 Sheets-Sheet 2
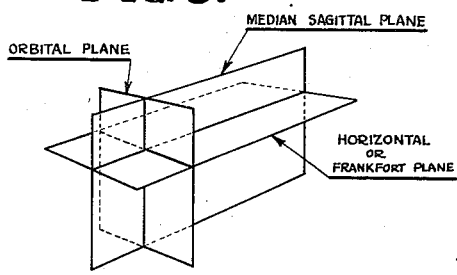
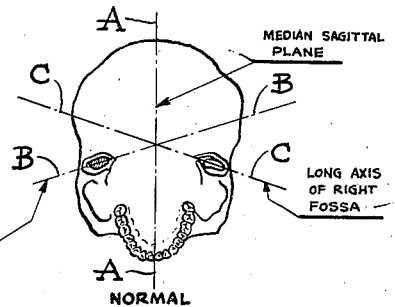
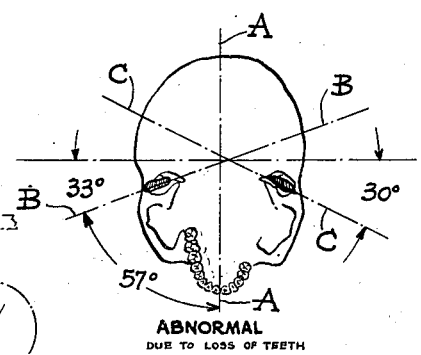
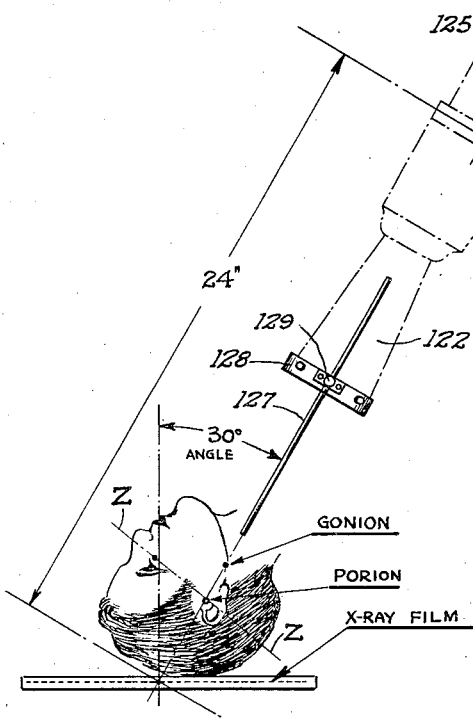
INVENTORS.
GEORGE T. PLOTZ
THEODORE W. MAVES
BY Hull, Brock & West
ATTORNEYS.

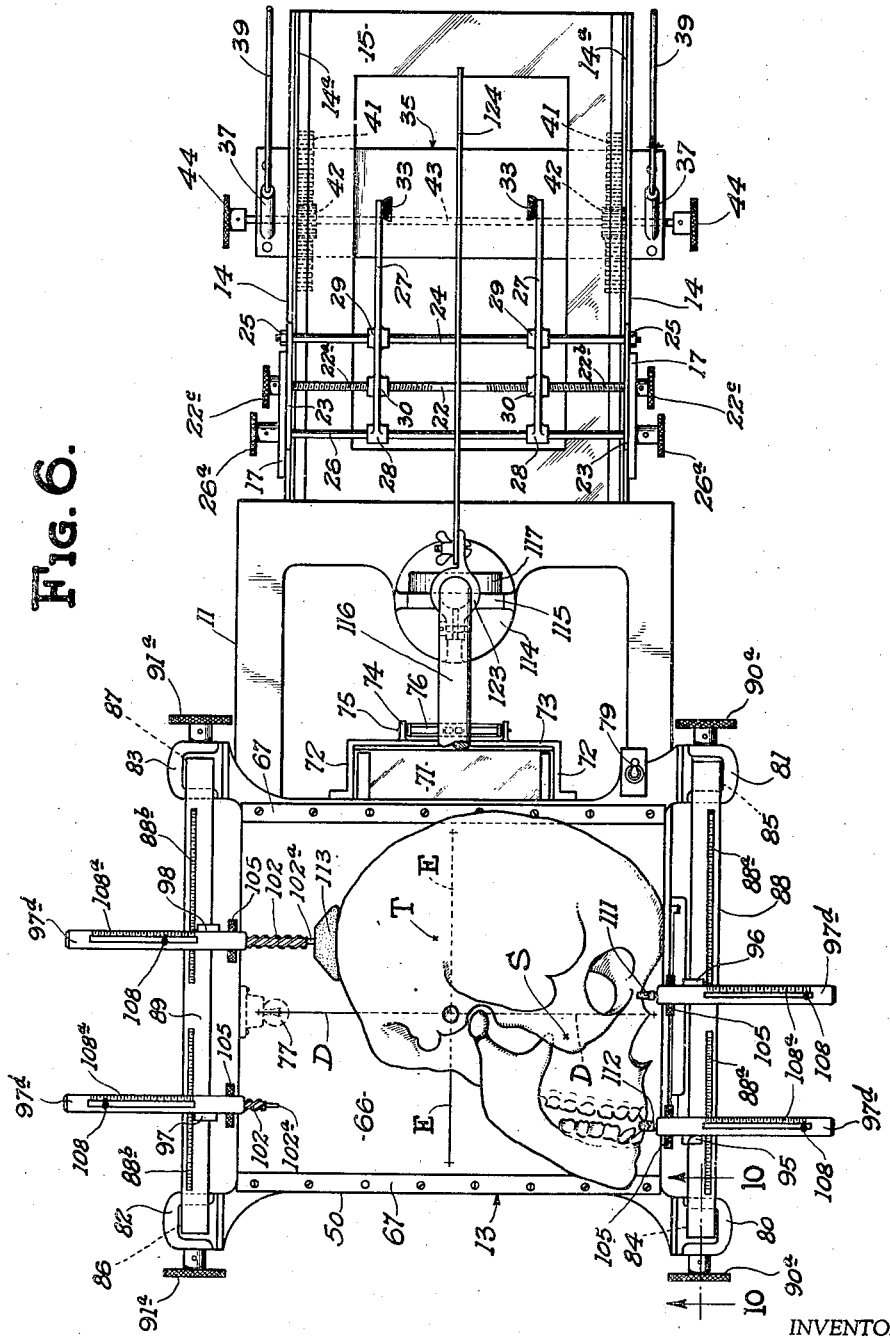

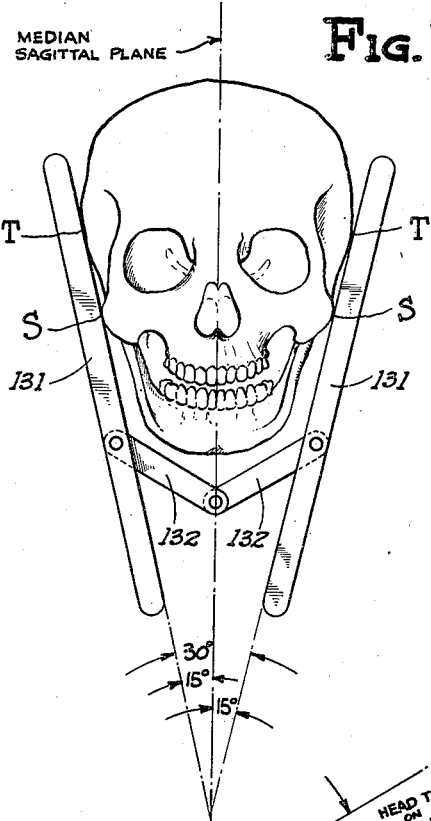
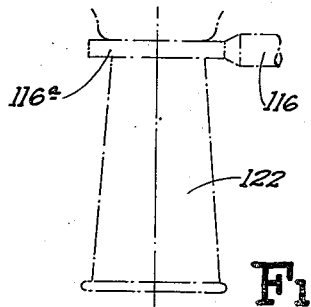
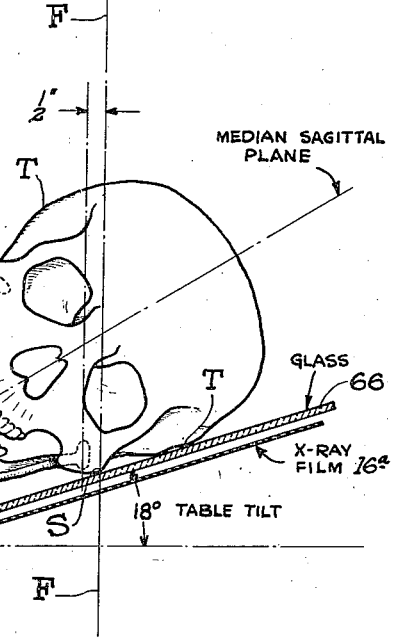
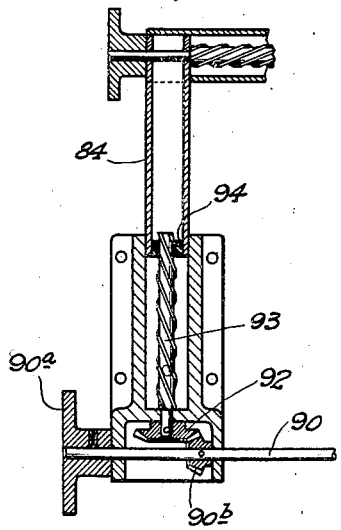

Patented Sept. 2, 1941

2,254,544

UNITED STATES PATENT OFFICE 2,254,544

MACHINE FOR MAKING CRANIAL ROENTGENOGRAPHS

George T. Plotz, Cleveland, and Theodore W. Maves, Cleveland Heights, Ohio; Winifred E. Maves, executrix of said Theodore W. Maves, deceased, assignor of the right of said Maves to said Plotz; Alma Plotz, administratrix of said George T. Plotz, deceased, assignor of one-half to Oscar A. Plotz, Lakewood, Ohio Application March 20, 1939, Serial No. 262,814

21 Claims. (Cl. 250—50)

This invention relates to an apparatus for making roentgenographs, and more particularly to an apparatus which will enable the heads of patients to be positioned and held in certain definite relations to the X-ray target and to the film holders or cassettes of such apparatus while projections of selected areas of their heads are being made and which will also enable an accurate re-establishment to be made thereafter of the precise areas thus projected. The machine herein is designed with special reference to the realization of a definite standardized technique for the roentgenography of the temporo-mandibular joint, whereby the positions of the condyle heads in their respective glenoid fossae may be accurately ascertained and plotted with reference to certain craniological points and planes and an accurate record of such positions made which will enable exact duplications to be made thereafter of the positions in which the head of a patient has been placed for such roentgenography.

By the use of roentgenographs thus obtained, it is possible to ascertain with exactness, and to remedy, displacements from normal of the condyle heads in their respective glenoid fossae and thereby to relieve, and even effect cures of, the injurious effects consequent upon such displacements.

In the operation of the apparatus which will be described at length thereinafter, roentgenographs of the head of each patient are made in the following sequence:

a. With the head placed in a dorsal position, with the median sagittal plane perpendicular to the cassette and approximately midway between the sides thereof and with the X-ray tube so arranged that the axis of the rays emanating from the target thereof will coincide with a line located within a plane extending through the gonions and porions of the patient's head midway between the opposed temporomandibular joints, and with the target placed at a distance from the cassette which will enable the condyle heads to be projected at approximately their actual size upon the film.

b. With the head of the patient resting with one side thereof in contact with the transparent pane above the cassette, and with the X-ray target so located that the rays delivered therefrom pass through the long axis of the condyle head which is adjacent to the said cassette, said long axis being also the long axis of the glenoid fossa of said condyle head.

c. With the head of the patient arranged in the same manner with respect to the X-ray tube and target as specified immediately hereinbefore but with the opposite side of the head resting upon the pane. The roentgenographs succeeding that taken with the head in the dorsal position supplement the former, the three cooperating to enable the practitioner to ascertain the exact positions of the condyle heads in their respective glenoid fossae.

The details of construction and the mode of operation of my apparatus whereby these results are obtainable will be explained in connection with the description of the drawings hereof, wherein Fig. 1 shows a side elevation of the operative portions of the machine, illustrating by the skull shown therein the dorsal or A. P. position in which a particular head is placed and held for the purpose of making the first roentgenograph of the series of roentgenographs which are to be taken in order to ascertain the positions of the condyle heads in their respective glenoid fossae positions; Fig. 2 a diagrammatic detail in elevation of the cassette placed in the base member of the machine shown in the preceding view and illustrating the position of the X-ray cone with reference to the head of the patient when the said head is place in the same position as the skull shown in the preceding view; Figs. 3 and 4 show tracings made from roentgenographs produced when the heads of patients are placed in the position shown in Figs. 1 and 2, Fig. 3 showing the direction of lines which are drawn through the long axes of the condyle heads intersecting the median sagittal plane when neither of the said condyle heads is displaced upperly, distally or laterally from a normal position within its fossa and Fig. 4 showing the directions of said lines when the condyle heads are so displaced; Fig. 5 is a perspective view of the planes of craniology used in positioning the heads of patients for radiography and in registering the angles and positions of the heads for duplication in radiography; Fig. 6 is a plan view of my apparatus (the X-ray source being omitted), showing by the skull therein the approximate position in which the head of a patient is placed and the manner in which it is held in position, for the purpose of making the next roentgenograph of the aforesaid series; Fig. 7 is a diagrammatic front elevation of a skull showing the manner in which the angle which the head of a patient makes with the tilting bed portion of my apparatus is ascertained; Fig. 8 a diagrammatic view illustrating the position of the head of the patient upon the tiltable base portion of my apparatus and the angle at which the same is tilted from the horizontal when making the second and third roentgenographs of the aforesaid series; Fig. 9 a detail in sectional elevation showing the construction and mode of operating the tilting bed portion of my apparatus; Fig. 10 is a detail in section taken on the line 10—10 of Fig. 6; and Fig. 11 is an enlarged detail in section corresponding to the line 11—11 of Fig. 9.

Describing the parts shown in the drawings, 10 denotes the legs which support the platform 11 and the two base members of my apparatus (indicated generally at 12 and 13) as well as the standard for the X-ray source. The legs are provided at the lower ends thereof with means (not shown) whereby the platform 11 and the base members 12 may be placed each in a horizontal position. The base member 12 is that whereon the first roentgenograph of the series referred to hereinbefore is positioned. As shown, it is secured to and constitutes an extension of the platform 11, being provided with side rails 14 and a bed plate 15 extending between the said rails, and with angle bars 14ª secured to the said rails and providing a horizontal support along which the cassette 16, which contains the X-ray film, may be moved.

17 denotes a pair of arms, each pivotally supported at its lower end from a side rail 14 by means of a stud 18, which may be threaded into a rail, each of said studs being shown as provided with an acorn clamping nut threaded on the outer end thereof. Each of the arms 17 is also provided, at the bottom thereof, with an arcuate slot 19, said slots being concentric with the respective studs 18. A threaded stud 20, which is carried by the adjacent rail, projects through each of these slots, the outer end of each stud being provided with an ornamental lock nut 21.

22 denotes a shaft (Fig. 6) which is rotatably mounted in the upper ends of the arms 17 and which has its ends reversely threaded, as indicated at 22ª, 22ᵇ, the outer ends of the shaft extending through the central portions of links 23 located adjacent to the inner faces of the upper ends of said arms. The front ends of these links project beyond the edges of their respective arms and support a rod 24, said rod being provided with acorn lock nuts 25 at the outer ends thereof. 26 denotes a rod which extends through the rear portions of the upper ends of the arms 17 and through the rear ends of the links 23, the outer ends of the rod 26 projecting through arcuate slots 17ª in the upper ends of the arms 17, said slots being concentric with the centers of the openings through which the shaft 22 extends. The ends of shaft 22 are shown as provided with knurled hand wheels 22ᶜ, and the ends of the rod 26 threadedly receive knurled lock nuts 26ª.

27 denotes a pair of clamping arms, each provided with sleeves 28 and 29 whereby they are slidably mounted upon the rods 24 and 26. They are also provided each with an internally and reversely threaded nut 30, said nuts receiving respectively the opposite threaded end portions 22ª and 22ᵇ of the shaft 22. The operating end of each of the arms 27 is provided with a pad 33, said pads being adapted to engage opposite sides of the head at the prominences of the zygomatic or cheek bones.

35 denotes a base plate which extends across the base member 12, beneath the bars 14ª which support the cassette, said base plate having its opposite ends mounted in slots 36 provided therefor and extending longitudinally of the rails 14, the bases of the slots being parallel with the upper surface of the cassette and with the plane of the film therein. The base plate is provided, adjacent to and externally of each of the rails 14, with a post 37 which may be conveniently cast or otherwise formed with or secured to the bed plate. Each of these posts is provided with a longitudinally extending socket 38, the axes of the posts and of the sockets forming identical acute angles with the horizontal surface of the cassette and the film therein, said acute angles being preferably 60°. 39 denotes a pair of direction-indicating rods detachably fitted within the sockets of said posts.

The base plate 35 is provided adjacent to each end thereof with a rack 41, the said racks being engaged by pinions 42 mounted on a shaft 43 which is journaled in the side rails 14 and which is provided on its opposite ends with knurled hand wheels 44.

45 denotes brackets which are mounted on the opposite sides of that end of the platform 11 which is opposite to the end from which the base member 12 extends. Each of these brackets has an arcuate groove 46 therein, the said grooves receiving arcuate flanges 48 on sectors 47 secured to opposite sides 49 of the frame of the tilting base member 13. The upper ends of the sides 49 of the frame of the base member 13 are located below the tops of the front and back members 50 and 51 of said frame (see Figs. 1 and 9), being located in the same horizontal plane and preferably forming means for supporting the opposite ends of a cassette 16. The front and back members of the frame are provided with top rails 50ª and 50ᵇ, which are in turn provided with angular seats 52, 53, respectively for the sides of the cassette, the bottoms of said angular seats being preferably in the plane of the top edges 49ª of the sides of the frame. The centers of curvature of the arcuate grooves 46 and of the arcuate flanges 48 coincide with the ends of a line which may be considered as extending across the film 16ª, from end to end thereof and parallel with the sides thereof. In practice the position of this line is indicated by a line drawn on the top of the cassette. One end of this line in indicated at X on Figs. 1 and 9. Because the base member 13 should afford a comfortable rest for the head of a patient having a short neck, this line is somewhat nearer the front side of the cassette (being the side which is adjacent to the front frame member 50) than the rear side. It will be evident, from the foregoing, that the axis of rotation of the base member 13 and of the film coincides with the aforesaid line of the film.

For the purpose of tilting the base member 13 about the axis referred to, I provide the following construction: 54 denotes a shaft having its opposite ends journaled in the sides of the platform 11 and provided at each end thereof with a knurled hand wheel 55. This shaft is provided, intermediate the ends thereof, with a pinion 56 meshing with a gear 57 on a shaft 58 having a coarse thread 59 thereon meshing with a nut 60 mounted within a guide 61 extending longitudinally of the platform and preferably midway between the sides thereof.

This nut is provided with lugs 62 between which one end of a link 63 is pivoted, the opposite end of said link being pivoted to lugs 64 depending from and secured to the bottom 65 of the frame work of the tilting base member.

The rails 50ª and 51ª with which the front and rear ends of the frame work of the tilting base member are provided have each a seat 50ᵇ, 51ᵇ, respectively, for the support of the front and rear edges of a pane 66 of transparent material, preferably glass, the seats being arranged to support the pane in close proximity to and parallel with the cassette 16 and the film 16ª. The pane is shown as slidably supported within the seats by means of upper overhanging guide plates 67 which are detachably connected to the rails 50ª and 51ª. 68 denotes a pivoted locking member located at each end of one of the seats for the said pane, each of said locking members having a screw 69 which, when the said members are swung to the position of the member shown in Fig. 1, can be adjusted to engage the edge of the pane adjacent thereto. The pane is provided with lines D, D and E, E, (as best shown in Fig. 6) said lines intersecting each other at right angles near the center of the pane, the intersection being located also nearly above the center of the film when the cassette is in place. Of these lines, the line D, D is located immediately above the axial line of the film when the cassette is in place. The line E, E intersects the line D, D midway between the ends of the latter; and these lines are formed in practice by grooving the pane to a depth of about $\frac{1}{32}''$ and filling the grooves with white lead, whereby the said intersecting lines may be projected upon the film.

For the purpose of enabling the operator to position the head of the patient properly upon the pane 66, preliminarily to placing the cassette upon its seat, the frame is provided with a mirror 70, (Fig. 9) so located as to reflect the image of the area of the head which is to be positioned upon the pane upon a second mirror 71, the second mirror being mounted in a frame having sides 72 and a base 73 secured to the wall 51, the said wall being provided with an opening 51ᶜ thereby to enable the image from the mirror 70 to be projected upon the mirror 71, whence the image may be conveniently viewed by the operator. The sides 72 of the frame are extended to provide brackets 74 which support a rod 75 from which a spirit level 76 is pivotally suspended.

For the purpose of further facilitating the proper positioning of the head upon the pane 16 and the inspection of the selected areas of the head with reference to the cross lines, a lamp 77 is mounted within the chambered space formed below the seat for the cassette, with conductors 78 extending from the said lamp to a switch 79. The arrangement of the mirrors as described hereinbefore cooperates with a lamp when positioned where shown in enabling the operator to position the head of the patient accurately upon the pane 66.

For the purpose of further positioning the heads of patients upon the pane 66 and to enable duplications of such positions to be made, the tiltable base member 13 is provided with vertically adjustable rails located above and adjacent to each side thereof and each having one or more posts movable therealong, each of the said posts carrying a member adapted to engage a portion of the head of the patient thereby to retain the head of the patient in the desired position for making the roentgenograph. Each corner of the frame work of the tiltable base member is provided with a boss, said bosses being indicated at 80, 81, 82 and 83. Each of these bosses is provided with a socket constituting a guide, said guides extending at right angles to the plane of the pane 66 and also at right angles to the plane of the film. Mounted in the said sockets are hollow posts 84, 85, 86 and 87. The posts 84 and 85 support at their upper ends a rail 88 and the posts 86 and 87 support at their upper ends a rail 89. These rails extend parallel with the pane 66 and with the plane of the film.

The posts 84 and 85 are raised and lowered by means of a shaft 90 journaled in the lower ends of the bosses 80 and 81, and the posts 86 and 87 are raised and lowered by a shaft 91 journaled in the lower ends of the bosses 82 and 83. The details of construction whereby the pairs of posts 84, 85 and 86, 87 are raised and lowered by their respective shafts are shown more particularly in Fig. 10, wherein the means for raising and lowering the post 84 are shown, it being understood that the same means will be employed in connection with each of the other three posts. In this view, one end of the shaft 90 is shown as provided with a bevel pinion 90ᵇ meshing with a bevel pinion 92 on the bottom of a screw 93 which is threaded through a nut 94 secured to and within the hollow post 84. Each of the shafts 90 and 91 is provided at opposite ends thereof with knurled hand wheels 90ª, 91ª, respectively, for operating the same.

Each of the side rails 88, 89 is shown as having a pair of posts slidably mounted thereon. These posts are indicated at 95, 96, 97 and 98. As these posts are identical in respect to the manner of mounting and moving the same upon their respective rails and are also identical in respect to the manner in which the elements which carry the various head-engaging rests are mounted and adjusted therealong, a detailed description of the manner of supporting and operating one of said posts and its component parts will suffice for all.

Referring to Figs. 9 and 11, it will be seen that the post 97 is provided with a horizontal flange 97ª which is adapted to ride upon the top of the rail 89 and with a vertical flange 97ᵇ which slidably engages the vertical inner face of the said rail, the said inner face being provided with a slot 89ª into which there projects a nut 97ᶜ carried by the flange 97ᵇ. A similar vertical flange 98ᵇ and nut 98ᶜ is also shown in Fig. 9 for the post 98. 99 denotes a screw of coarse pitch which is threaded through the nut 97ᶜ, said screw having one end journaled in the end of the rail 89 adjacent to the post 97 and its opposite end journaled in a block 100 extending into the slot 89ª of the rail 89. A similar screw 101 is threaded through the nut 98ᶜ, said screw having one end journaled in the end of the rail 89 adjacent to the post 98 and its opposite end journaled in the block 100. These screws are provided each with a knurled hand wheel 99ª and 101ª, respectively.

Referring more particularly to Fig. 11, wherein the details of the post 97 and its associated parts are shown, it will be noted that the upper end of this post is provided with a hollow arm 97ᵈ extending at right angles therefrom parallel with the pane 66. A coarse screw 102 extends through a nut 104 having a knurled hand wheel 105 thereon and mounted in a bracket 106. This screw has a block 107 at its outer end to which is secured a pointer 108 extending over a scale 108ᵃ on the arm 97ᵈ. When the screw is operated to bring a rest thereon into engagement with the head of the patient, an exact record can be made of the position of the said rest. Similar scales 88ᵃ and 88ᵇ are provided on the side rails 88 and 89, respectively, with each of which scales an appropriate edge portion of the horizontal flange of one of the posts 95—98 cooperates, thereby to indicate the position to which each post is moved with reference to the adjacent end of the rail whereon it is mounted. Due to the construction and arrangement of the scales and the indicating means referred to, the position of each post and of the head rest carried thereby can be definitely and accurately ascertained and a record of the same made which will enable the head of the patient to be replaced in exactly the same position in making subsequent roentgenographs thereof. The screws in the other horizontal hollow arms, the scales with which they respectively cooperate, and the hand wheels which operate the screws are designated by the same characters that are applied to these elements as associated with the post 97—97ᵈ.

Three head rests are shown in Fig. 6, said rests being indicated at 111, 112 and 113, and engaging respectively the nasion, prosthion and occiput of a skull positioned with one side thereof resting upon the pane 66. These rests are removably mounted upon the reduced extensions 102ᵃ of the screws 102. It will be obvious that, when the head of the patient is placed with the opposite side from that shown in Fig. 6 in contact with the pane, the nasion and prosthion rests will be applied to the reduced extensions 102ᵃ of the screws on the left hand side of the tilting base while the occiput rest will be transferred to the reduced extension of the uppermost screw on the right hand side of the base.

114 denotes a standard which is mounted upon the rear portion of the platform 11, said standard being provided at its upper end with a circular base 115 to which the circular base 117 of the post 116, which supports the X-ray tube, is pivotally secured by means of the bolt 118 and the wing nut 119. The bolt is anchored against rotation in the base member 117 but is pivotally mounted within the base 115, being provided with a pointer 120 which is adapted to register with an arcuate scale 121 whereby the post may be clamped in any desired angular relation to the top of the platform 11 therebeneath. As used herein, it is clamped in a position such that a vertical plane including the same will be at right angles to the plane of the top of said platform.

The post 116 is curved forwardly above the tilting base member 13 and is there provided with a horizontally arranged ring 116ᵃ, which ring is adapted to support the X-ray tube 122 (the lower portion of which is shown in Fig. 1) with the axis of the rays projected from the target directed vertically and at the intersection of the lines D—D and E—E on the pane 66. Mounted upon the vertical portion of the post 116 is a split collar 123 having a blade-like arm 124 pivoted between lugs thereof whereby the arm can be swung up and down in a vertical plane. When swung to the position shown in dot-and-dash lines in Fig. 1, it enables the head of a patient placed upon the cassette 16 on the base member 12 to be positioned with the median sagittal plane coinciding with the central longitudinal axis of the cassette and the film therein.

Fig. 5 has been referred to hereinbefore as showing the planes of craniology with reference to which the heads of the patients are positioned for purposes of radiography. The manner in which the planes are so used will be explained in connection with the following description of the operation of my apparatus.

In making the first roentgenograph of the series, the head of the patient has the marks Y—Y applied thereto immediately above the gonions and porions. It is then placed upon the cassette 16 in the dorsal or A. P. position shown in Fig. 1; with the head tilted rearwardly so that a plane passing through the gonions and the porions will strike the top of the cassette about midway between the front and rear ends of the same, said plane forming an angle preferably of 60° with the plane of the top of said cassette. This position can be accurately obtained by moving the base plate 35 to the position shown in Fig. 1 and by adjusting the head until the points Y, Y on both sides register with corresponding edges of the rods 39. The head is also centered by means of the blade 124 so that the median sagittal plane coincides with the longitudinal central axis of the cassette and of the film therein, and is clamped in position by the arms 27 and the rest-pads 33. The construction of the arms 17, including the means for pivoting the bottoms of said arms and for adjusting the positions of the rods 25 and 26, with reference to the shaft 22, to which they are pivotally connected, enables the assembly including the arms 27 to be conveniently adjusted to a position which will enable the heads of patients to be placed in the proper position upon the cassette 16 without encountering any of the parts of said assembly; it also enables me to limit the length of the base member 12 to that necessary only to accommodate the necessary adjustments of the cassette along its support to cooperate with variations in dimensions and contours of the heads, and variations in the lengths of the necks, of various patients.

To further facilitate the positioning of the head, the top of the cassette is provided with cross-lines one of which connects the central points of the opposite sides thereof and the other of which connects the central points of the opposite ends thereof. The fork 125 which supports the X-ray tube is moved to the position indicated in Fig. 2 whereby the axis of the rays projected from the target 126 may be delivered at an angle of 60° with reference to the plane of the top of the cassette. To insure the proper positioning of the X-ray tube for this purpose, rods 127 are mounted on posts 129 projecting from opposite sides of a ring 128 which is clamped to the bottom of the X-ray tube 122. The lower ends of these rods are inserted into the sockets 38 from which the rods 39 will have been removed. This insures that the axis of the rays projected from the target will be within a plane included between the rods 127 as well as being projected midway between said rods. This inturn insures the projection upon the film of the areas of the heads which are to be used in making the tracings such as shown in Figs. 3 and 4, each of such areas including the foramen magnum, the palatine suture, and the condyle heads within their respective fossae. The rods 127 will be so positioned within their respective posts 129 that the target 126 will be located 24 inches away from the film when the lower ends of the rods are fitted within the sockets 38, since this distance insures the projection of the condyle heads and their respective fossae at substantially their exact size upon the film.

Upon a roentgenograph made in the manner described, it is possible to draw a line corresponding to the median sagittal plane, since said plane will include the said suture and the basion and opisthion of the foramen magnum; also to draw lines through the long axes of the condyle heads and their respective glenoid fossae intersecting the first-mentioned line. From roentgenographs having these lines drawn thereupon, tracings such as shown in Figs. 3 and 4 can be made, wherein the line A—A represents the positions of the median sagittal plane and the lines B—B and C—C are the lines which are drawn through the longitudinal axes of the condyle heads and their respective fossae. From roentgenographs thus taken and tracings thus made, it is possible to ascertain the extent of the displacement (if any) of the condyle heads in their respective glenoid fossae and to determine the exact angle which the long axis of each of said heads and its fossa makes with the median sagittal plane.

By placing the head of the patient and the X-ray tube in their cooperative positions with reference to the plane of the film, I am able to make satisfactory roentgenographs with the relatively low-powered machines with which dental offices are usually equipped, as well as with the high-powered machines used by the dental and medical professions; and such roentgenographs will show clearly the outlines of the condyle heads.

The next roentgenograph in the series is taken with one side or the other of the patient's head resting upon transparent pane 66 on the pivoted bed or base member 13, the angle at which the said base member is tilted with respect to a horizontal plane being that which is necessary in order to enable the X-rays from the source to be projected axially along the axis of the lower condyle head and its fossa, such angle being determined by reference to the preceding roentgenograph. In Figs. 6 and 8, I have indicated the position of the head by means of a skull having the left side presented toward the X-ray film. In the former view, however, the median sagittal plane is parallel with the pane 66, for convenience in illustrating the positions of the nasion and prosthion rests. In the latter view, the skull represents the position of the head when the latter is resting comfortably upon the pane, being supported by the zygomatic bone and the most protuberant position of the temporal bone. However, since roentgenographs will be made of the head with each side thereof presented toward the said film, it is immaterial which of the two sides be photographed first.

In making the second roentgenograph, the patient is placed in an upright vertical sitting position, a pencil mark or dot is made on one side of the face at a point coinciding with the position of the porion and a second dot or mark is placed at the lower border of the orbit. A straight line Z—Z is then drawn upon the face connecting the porion and orbit. A repetition of this technique is made upon the opposite side of the face when the third roentgenograph in this series is made. These lines coincide with what is known in craniology as the eye-ear plane, the horizontal plane and the Frankfort plane; and in use each of these lines will in turn be superimposed upon the line D—D upon the glass pane 66 and preferably with the lower porion positioned directly above and at the intersection of the cross lines D—D and E—E on said pane.

The head of the patient rests comfortably upon the said pane, being supported by the zygomatic bone and the most protuberant part of the temporal bone, whereby the median sagittal plane will be inclined toward the said pane at the angle which the line joining the zygomatic bone and the aforesaid portion of the temporal bone makes with the said pane. The points corresponding to the zygomatic bone and the most protuberant portion of the temporal bone are indicated at S, T on the skull shown in Figs. 2, 6, 7 and 8. But, since the point T is at the rear of the point S and is at a greater distance from the median sagittal plane than the latter point, the head will also be inclined from rear to front toward said pane. The purpose of placing the head of the patient upon the pane in this manner is to provide, in combination with the rests 111, 112 and 113, means for supporting the head in a fixed position, which position can be conveniently duplicated at subsequent times; also to enable me to project an outline of the lower condyle head and its fossa upon the film without any superposition thereupon of the outline of the upper condyle head and its fossa; and to accomplish this latter object while supporting the X-ray tube in the ring 116ª, with the axis of the rays projected from the target preferably coinciding with a vertical line passing through the lower portion and in close proximity to the lower condyle head, as shown by the line F, F in Fig. 8. It will be understood that the ring 128 will be removed from the bottom of the cone before the X-ray tube can be supported by the ring 116ª in the manner indicated in Figs. 1 and 8. The angle which the median sagittal plane makes with the pane 66 when the head is supported thereon in the manner indicated in Fig. 8 is an important factor in determining the angle at which the base member 13 is to be tilted from the horizontal in order to enable the axis of the rays projected from the target of an X-ray tube, supported as indicated in Fig. 1, to be directed substantially along the long axis of the lower condyle head and its fossa. Assuming that the axis of the condyle head which is first to be placed adjacent to the pane makes an angle of 57° with the median sagittal plane, as has been ascertained from the first roentgenograph shown in Fig. 4: this will leave an angle of 33° between the said axis and a horizontal plane. Should the head be placed upon the pane 66, with the median sagittal plane parallel with the same (as is the case with the skull in Fig. 6) then the base member 13 would have to be tilted to an angle of 33° in order to enable the rays from the X-ray target to be projected longitudinally of the axis of the condyle head adjacent to the pane. But, when the head is placed in the position shown in Fig. 8, the median sagittal plane then makes an angle with the pane which angle must be deducted from the angle of 33°, and the base member and its pane tilted only through the resultant angle. The manner in which the angle which the median sagittal plane makes with the pane, when the head is supported in the manner shown in Fig. 8, can be determined by the use of a gage such as shown in Fig. 7, said gage comprising arms 131 connected by links 132, the arms resting upon the points indicated at S and T on opposite sides of the head. In the particular instance illustrated in Fig. 7, the arms when so placed make an angle of 30° with respect to each other and an angle of 15° each with the median sagittal plane. In order to bring the axis of the lower condyle head in substantial coincidence with the axis of the rays projected from the target located vertically above the axis of the film, it will be necessary to tilt the base member and the pane thereof a distance of 33° less 15°, or an angle of 18° from the horizontal.

When the base member shall have been set at this angle, the head of the patient is placed upon the pane with the marks indicating the positions of the porion and the horizontal or Frankfort plane placed in the positions hereinbefore described and with the head supported by the zygomatic bone and the most protuberant part of the temporal bone. This positioning is facilitated by use of the mirrors 70 and 71 and the lamp 77. The head is then held in the position by means of the nasion, the prosthion and the occiput rests, after which the cassette will be inserted and the exposure made in the usual manner.

The advantages of positioning the head of the patient in the manner described are that it enables a satisfactory projection of the lower condyle head and its fossa to be obtained through the long axes thereof, and that it provides a position which the head will naturally assume when the cheek is resting upon the pane, this position being also one in which the head may be accurately replaced for the purpose of making subsequent re-projections of the aforesaid parts.

Figs. 6 and 8 of the drawings represent the positions in which heads of patients have been placed in the actual operation of our apparatus for projecting rays from X-ray tubes along the long axis of lower condyle heads and their fossae. However, if the X-ray tube be moved one-half inch along the Frankfort plane, the central or axial ray projected from the target will pass directly through the long axis of the lower condyle head and automatically through the long axis of its fossa.

The rests are so mounted, as has been explained hereinbefore, as to enable their exact positions (and, therefore, the position of the head) to be recorded; hence, the position of the head of the patient may be exactly duplicated in making subsequent roentgenographs.

It will be readily understood how the next roentgenograph in the series may be made by merely reversing the position of the head so that the other side will be presented against the pane 66, with the lower porion arranged at the intersection of the lines D—D and E—E and with the line Z—Z on the then lower side of the head superimposed upon the line D—D. The head will be retained in this position by means of the rests 111, 112 and 113, by placing the first two rests upon the reduced extensions of the screws 102 on the left hand side of the base member shown in Fig. 6 and by placing the occiput rest 113 upon the reduced end of the upper of the two screws on the right hand side of the base member.

The target of the X-ray tube is placed 24 inches from the film in making the second and third roentgenographs in the series of the same.

The apparatus shown and described herein can obviously be used in connection with dental specialty technique, since it enables repeated roentgenographs to be made of identical definite oral areas for purposes of comparison of these areas as corrective treatment of the same progresses. It can also be used in connection with head surgery, in order to enable roentgenographs of definite identical areas of the head to be made both before and after operations thereupon. It can also be used for diagnostic purposes.

Having thus described our invention, what we claim is:

1. An apparatus for making complementary roentgenographs comprising in combination a base member having means for supporting a cassette thereon, means for supporting the head of a patient in a dorsal position above a film in said casette with a plane including the gonions and porions forming an acute angle with respect to the plane of said film and with the median sagittal plane intermediate the side edges of said film, means for supporting an X-ray tube in a position to direct rays thereof along a plane passing through the said gonions and porions and along the median sagittal plane, thereby to project upon said film the outlines of the condyle heads and glenoid fossae, a second base member and means rotatably supporting the same, said second base member having means for supporting a cassette thereon, means for supporting the head of a patient with the lower porion and the lower condyle head and fossa above the film in said casette, and means for supporting an X-ray tube in a position to project rays thereof upon the lower condyle head and fossa and axially thereof.

2. An apparatus for making complementary roentgenographs comprising in combination a platform, a base member carried thereby and having means for supporting a cassette thereon in a substantially horizontal position, means for supporting the head of a patient in a dorsal position above the film in said cassette with a plane including the gonions and porions forming an acute angle with respect to the plane of said film and with the median sagittal plane intermediate the side edges of said film, means for supporting an X-ray tube in a position to direct rays thereof along a plane passing through the said gonions and porions and along the median sagittal plane, thereby to project upon said film the outlines of the condyle heads and glenoid fossae, a second base member rotatably supported by said platform, said second base member having means for supporting a cassette thereon, means for supporting the head of a patient with the lower porion and the lower condyle head and fossa above the film in said cassette and means mounted on said platform for supporting an X-ray tube in a position to project rays thereof upon the lower condyle head and fossa and axially thereof.

3. An apparatus for making roentgenographs comprising means for supporting a cassette, means for supporting the head of a patient in a dorsal position above a film in said cassette with a plane passing through the gonions and porions intersecting the plane of said film at an acute angle and with the median sagittal plane intermediate the side edges of the film, means for supporting an X-ray tube in a position to direct rays thereof along a plane passing through the gonions and porions and along the median sagittal plane, thereby to project upon said film the outlines of the condyle heads and glenoid fossae, and means for supporting an X-ray tube with rays thereof projected upon the lower porion and the lower condyle head and fossa.

4. An apparatus for making complementary roentgenographs comprising means for supporting a cassette in a substantially horizontal position, means for positioning the head of a patient above a film in said cassette with a plane including the gonions and porions forming an acute angle with the said cassette and with the film therein and with the median sagittal plane located substantially midway between opposite side edges of the said film and cassette, means for supporting an X-ray tube in a position to direct rays thereof along a plane including the gonions and porions and along the median sagittal plane, thereby to project upon said film the outlines of the condyle heads and glenoid fossae, a second base member having means for removably supporting a cassette, means for tilting the second base member, means for supporting the head of a patient above the cassette support with the lower porion located above the central portion of the said film, with the then lower end of the Frankfort plane positioned above and substantially registering with the central portion of said film, and with the upper porion out of axial register with the lower porion, and means for supporting an X-ray tube above said second base member in a position to project rays therefrom upon the said lower porion and axially of the lower condyle head and glenoid fossa.

5. An apparatus for making complementary roentgenographs comprising a base member having means for supporting a cassette, means for positioning the head of a patient on said base member above a film in said cassette, with a plane including the gonions and porions forming an acute angle with the said cassette and with the film therein and with the median sagittal plane located substantially midway between opposite side edges of the said film and cassette, means for supporting an X-ray tube with the axis of its rays directed along a plane including the gonions and porions and substantially along the median sagittal plane, thereby to project upon said film the outlines of the condyle heads and glenoid fossae, a second base member having means for removably supporting a cassette, means for tilting the second base member about an axis coinciding with a line connecting opposite ends of the film in the cassette and substantially midway of said ends, means for supporting the head of a patient above the said cassette, with the lower porion located above the said line and with the lower end of the Frankfort plane positioned above and substantially registering with the said line, and means for supporting an X-ray tube above said second base member in a position to project rays therefrom upon the said lower porion and axially of the lower condyle head and fossa.

6. An apparatus for making complementary roentgenographs comprising a platform, a base member supported by said platform, the said base member being provided with means for supporting a cassette thereon with its film in a substantially horizontal plane, means for locating and supporting the head of a patient in a dorsal position upon said base member above said film with the gonions and porions in a plane forming an acute angle with the said film and with the median sagittal plane intermediate the side edges of said film, means for supporting an X-ray tube in a position to project rays therefrom at substantially the aforesaid acute angle with respect to the plane of said film, a second base member rotatably supported by said platform, said second base member having means for supporting a cassette thereon with a line intermediate the sides of the film thereof and substantially parallel with said sides coinciding with the axis of rotation of the second base member, means for rotating the second base member about such axis, means for supporting the head of a patient with the lower porion and the lower condyle head and fossa directly above said line and with the bottom of the Frankfort plane registering with said line, and a support for an X-ray tube carried by said platform, the last mentioned support comprising an element adapted to retain the X-ray tube in a position to direct its rays upon the lower porion and axially of the lower condyle head and fossa.

7. In the apparatus recited in claim 6, a post mounted on said platform and having its upper end extending above the tiltable base member and provided with a ring for supporting the X-ray tube, and a gauge arm pivotally supported by the said post and adapted to be swung above a head placed upon the first base member thereby to facilitate the positioning of the median sagittal plane of said head with reference to the film.

8. An apparatus for making roentgenographs comprising a base member provided with means for removably supporting a cassette thereon, a direction indicating element mounted adjacent to each side of the supporting means and of a cassette thereon, the said elements forming identical angles with respect to the plane of a film in said cassette, an X-ray tube, rods for causing the rays therefrom to be directed at a definite angle with respect to said film, and extended seats for the lower ends of said rods said seats being located adjacent to opposite sides of said cassette and located in a plane including the said elements.

9. An apparatus for making roentgenographs comprising a base member having means for supporting a cassette thereon, means for positioning and supporting the head of a patient in a dorsal position above the film in said cassette, and means on opposite sides of the cassette support for positioning an X-ray tube thereby to direct rays therefrom at a definite angle with respect to the film in said cassette, an arm mounted for movement in a vertical plane approximately midway between the sides of the cassette support, and means movable into and out of engagement with opposite sides of the head for supporting the head of the patient above the film in the cassette.

10. An apparatus for making roentgenographs comprising a base member having side rails provided with means for removably supporting a cassette, supporting members mounted adjacent to opposite sides of the cassette supporting means and each having a socket extending longitudinally thereof, said sockets making identical acute angles with respect to the plane of a film in the cassette, direction-indicating elements removably mounted in said sockets, and an X-ray tube having direction indicating rods secured thereto and adapted to enter the said sockets.

11. An apparatus for making roentgenographs comprising a base member having side rails provided with means for removably supporting a cassette, said rails being provided with longitudinal slots below the cassette supports and parallel therewith, a base plate having its opposite ends mounted in said slots and having supporting members projecting from opposite ends thereof and each having a socket extending longitudinally thereof, said sockets making identical acute angles with respect to the plane of a film in the cassette, direction-indicating elements removably mounted in said sockets, an X-ray tube having direction indicating rods secured thereto and adapted to enter the said sockets, and means for moving the said base plate along the said slots.

12. In the apparatus set forth in claim 10, means for positioning and holding the head of a patient above the film in said cassette and with the gonions and porions in a plane including the indicating portions of said elements and with the median sagittal plane substantially perpendicular to the said film.

13. An apparatus for making roentgenographs comprising a base member having means for supporting a cassette thereon and means for positioning the head of a patient above a film in said cassette, the second means comprising a standard, an arm carried by said standard and pivotally connected thereto for movement in a vertical plane, direction-indicating elements mounted on opposite sides of the cassette support and forming identical angles with the film, an X-ray tube, means for supporting the said tube in a position whereby rays projected therefrom will be directed in a plane including the indicating portions of said elements, said means comprising a rod operatively connected to each side of the X-ray tube and having its lower end insertable into and removable from a seat coinciding in direction with the direction of the indicating portions of said elements, and means for supporting the head of a patient in a position determinable by the foregoing means.

14. An apparatus for making roentgenographs comprising a base member having side rails and a substantially horizontal seat for a cassette adjacent to the upper edges of said rails, said rails having each a longitudinally extending slot beneath the cassette support and parallel therewith, a base plate having its ends mounted in said slots, said base plate having adjacent to each end thereof means for positioning an X-ray tube at a definite angle with respect to the cassette, and means for adjusting the said base plate along said slot, said means comprising a rack carried by each end portion of the said base plate, a shaft journaled in said rails, and pinions carried by said shaft and meshing with the said racks.

15. An apparatus for making roentgenographs comprising a base member having means for removably supporting a cassette thereon, and means for supporting the head of a patient in a dorsal position above a film in said cassette and with the sides of the head interposed between the side edges of said film, the second means comprising an arm pivotally supported on each side of the cassette support and extending thereabove, one or more guide rods connecting the upper ends of said arms, a shaft mounted in the upper ends of said arms and having end portions thereof oppositely threaded, and arms slidably mounted upon the said rod or rods and extending longitudinally with respect to and above the cassette support, said arms being provided each with a sleeve nut adapted respectively to receive the oppositely threaded portions of the said shaft whereby the said arms may be moved toward and from each other, and a rest carried by each of said arms for engaging a portion of the side of the head of a patient.

16. An apparatus for making roentgenographs comprising a base member having means for removably supporting a cassette thereon, and means for supporting the head of a patient in a dorsal position above a film in said cassette and with the sides of the head interposed between the side edges of said film, the second means comprising an arm pivotally supported on each side of the cassette support and extending thereabove, the lower end of each arm being provided with an arcuate slot concentric with the pivotal mounting thereof and with a stud projecting through each slot and having a lock nut thereon, a shaft mounted in the upper ends of said arms and having end portions thereof oppositely threaded, a link adjacent to the upper end of each arm and through intermediate portions whereof the said shaft extends, guide rods extending through the front and rear end portions of the said links, the upper end of each arm being provided with an arcuate slot concentric with the said shaft and through which slots the ends of one of said rods project, and arms slidably mounted upon the said rods and extending longitudinally with respect to and above the cassette support, said arms being provided each with a sleeve nut adapted respectively to receive the oppositely threaded portions of the said shaft whereby the longitudinally extending arms may be moved toward and from each other, a rest carried by each of said arms for engaging a portion of the side of the head of a patient, and lock nuts for the ends of the rod which extend through the upper arcuate slots of the first-mentioned arms.

17. An apparatus for making roentgenographs comprising a base member having a head support and provided with a seat below said support for removably supporting a cassette, means for positioning and holding the head of a patient on said head support above said cassette and in definite relation to a line extending across the film of the cassette, substantially midway between the side edges thereof, means for tilting said base member and the head support thereof about an axis coincident with the said line, and means for supporting an X-ray tube in a position to project rays thereof in a plane including the said line.

18. An apparatus for making roentgenographs comprising a base member having a head support and provided with means for removably supporting a cassette thereon below said head support, means for rotating the said member and the head support and the cassette support thereof with respect to a horizontal plane and about an axis coincident with a line joining the opposite ends of a film in a cassette on said cassette support and substantially midway between the side edges of said film, means for positioning and supporting the head of a patient upon the head support with one side thereof above and presented toward the cassette on the cassette support and with the Frankfort plane above and registering with the said line, and means for supporting an X-ray tube above said base member in a direction to project the outlines of the lower condyle head and fossae upon a portion of the film including a portion of said line.

19. An apparatus for making roentgenographs comprising a base member provided with means for removably supporting a cassette thereon, a transparent pane mounted above and in close proximity to the upper surface of a cassette on said supporting means, the said pane having cross lines, one of which is directly above a line connecting opposite ends of the upper surface of a film in a cassette on said support and substantially midway between the side edges thereof and the other of which extends at right angles to the first mentioned line and substantially midway between the ends of said pane, and means for positioning the head of a patient upon the pane, said means including a light located below the said pane and below said cassette, and mirrors also located below said pane and below said cassette, and means for engaging a head thus positioned, thereby to retain the same in place.

20. An apparatus for making roentgenographs comprising a base member provided with a seat for a cassette, the said base member also being provided, adjacent to each of the opposite ends of said seat, with a pair of laterally spaced vertically extending guideways, a post vertically movable in each of the said guideways, a rail connecting the upper ends of each pair of posts, means for raising and lowering each pair of posts and the rails carried respectively thereby, posts slidably mounted on each of said rails, means for moving the second mentioned posts along their respective rails, rest-supporting members carried by the second mentioned posts, and means for moving the said members to bring the rests thereon into engagement with cranial points on the head of a patient supported above said cassette.

21. In the apparatus set forth in claim 20, the rails being provided with means for indicating the positions to which the posts mounted thereon are moved and the posts on said rails being provided with means for indicating the positions to which the rest-supporting members carried thereby are respectively moved.

GEORGE T. PLOTZ.
THEODORE W. MAVES.